United States Patent [19]

Duret et al.

[11] 4,281,966
[45] Aug. 4, 1981

[54] MULTI-BLADE PROPELLERS

[75] Inventors: Maurice L. Duret, Aix-en-Provence; Bernard L. J. Lamarche, Velaux; Marc A. Declercq, Pelissanne; Robert D. Martin, Aix-en-Provence, all of France

[73] Assignee: Societe Nationale Industrielle Aerospatiale, France

[21] Appl. No.: 55,096

[22] Filed: Jul. 5, 1979

[30] Foreign Application Priority Data

Jul. 7, 1978 [FR] France .................................. 78 20258

[51] Int. Cl.$^3$ ....................... B64C 11/06; B64C 11/32
[52] U.S. Cl. ................................ 416/134 A; 416/136;
416/138; 416/168 R
[58] Field of Search ............... 416/134 A, 136, 138 R,
416/138 A, 168

[56] References Cited

U.S. PATENT DOCUMENTS

| 3,484,174 | 12/1969 | McCoubrey | 416/230 A X |
|---|---|---|---|
| 3,594,097 | 7/1971 | Mouille et al. | 416/136 X |
| 3,669,566 | 6/1972 | Bourquardez et al. | 416/230 A X |
| 3,762,834 | 10/1973 | Bourquardez et al. | 416/230 A X |
| 4,008,980 | 2/1977 | Noehren et al. | 416/134 A |
| 4,047,839 | 9/1977 | Ferris et al. | 416/134 A |

FOREIGN PATENT DOCUMENTS

| 1020896 | 2/1966 | United Kingdom | 416/138 |
|---|---|---|---|
| 1190259 | 4/1970 | United Kingdom | 416/136 |
| 1314308 | 4/1973 | United Kingdom | 416/134 A |
| 2026416 | 2/1978 | United Kingdom | 416/136 |

Primary Examiner—Everette A. Powell, Jr.
Attorney, Agent, or Firm—Karl W. Flocks

[57] ABSTRACT

A variable-pitch, multi-blade propeller specially usable as a rear rotor of a rotary-wing aircraft and a process for manufacturing the same are described. The propeller comprises a number of pairs of blades emanating from a central hub, each pair comprising a single elongate strip secured at its center to the hub. The strip is composed of two flat bundles of fibres and defining an aperture for a sliding shaft at their center. The shaft is used to control the pitch angles of the blades and aerodynamic blade shells are secured to the fibre bundles by adhesive synthetic cellular or foam material.

12 Claims, 9 Drawing Figures

U.S. Patent  Aug. 4, 1981  4,281,966
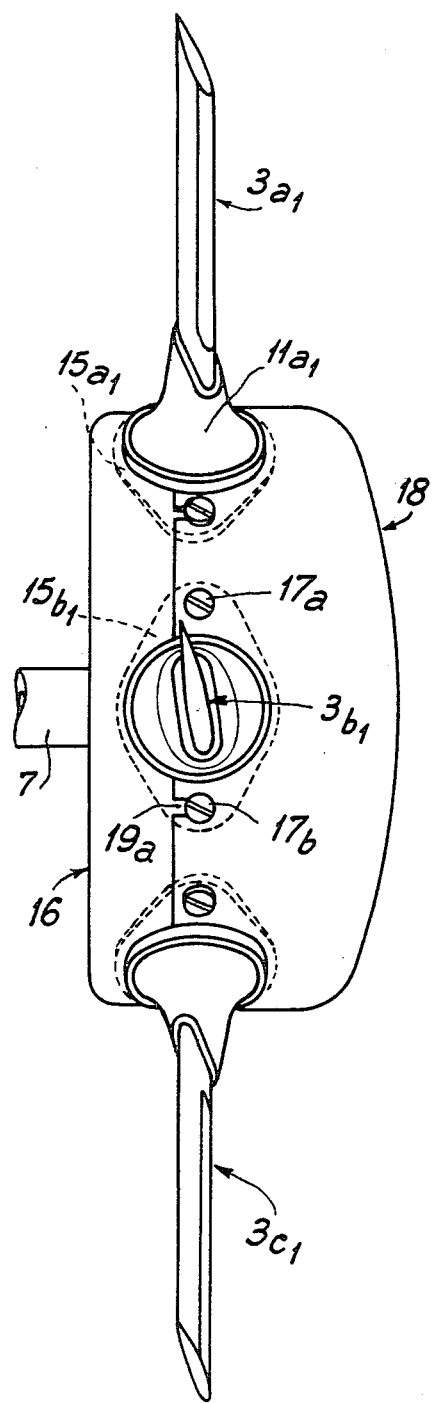
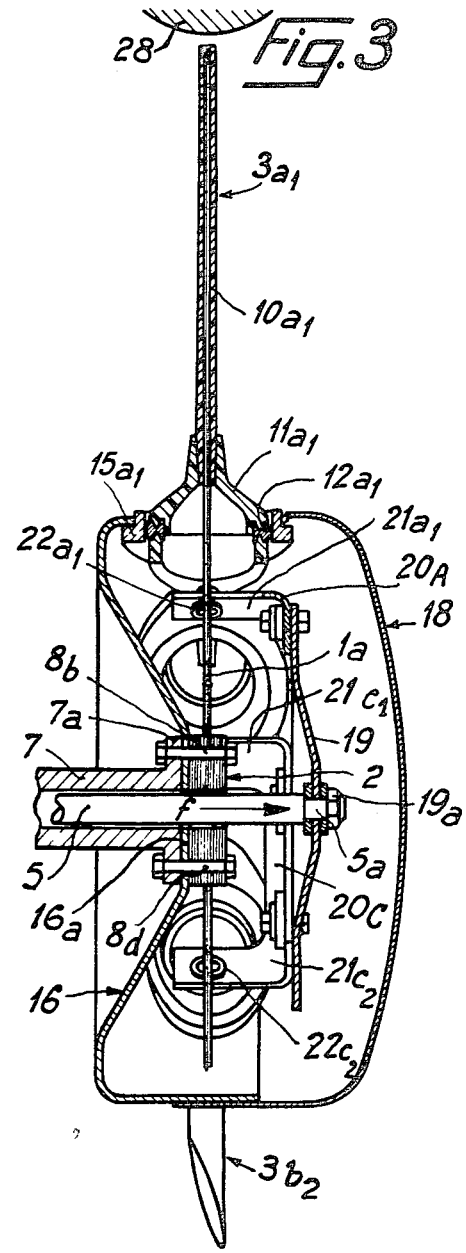

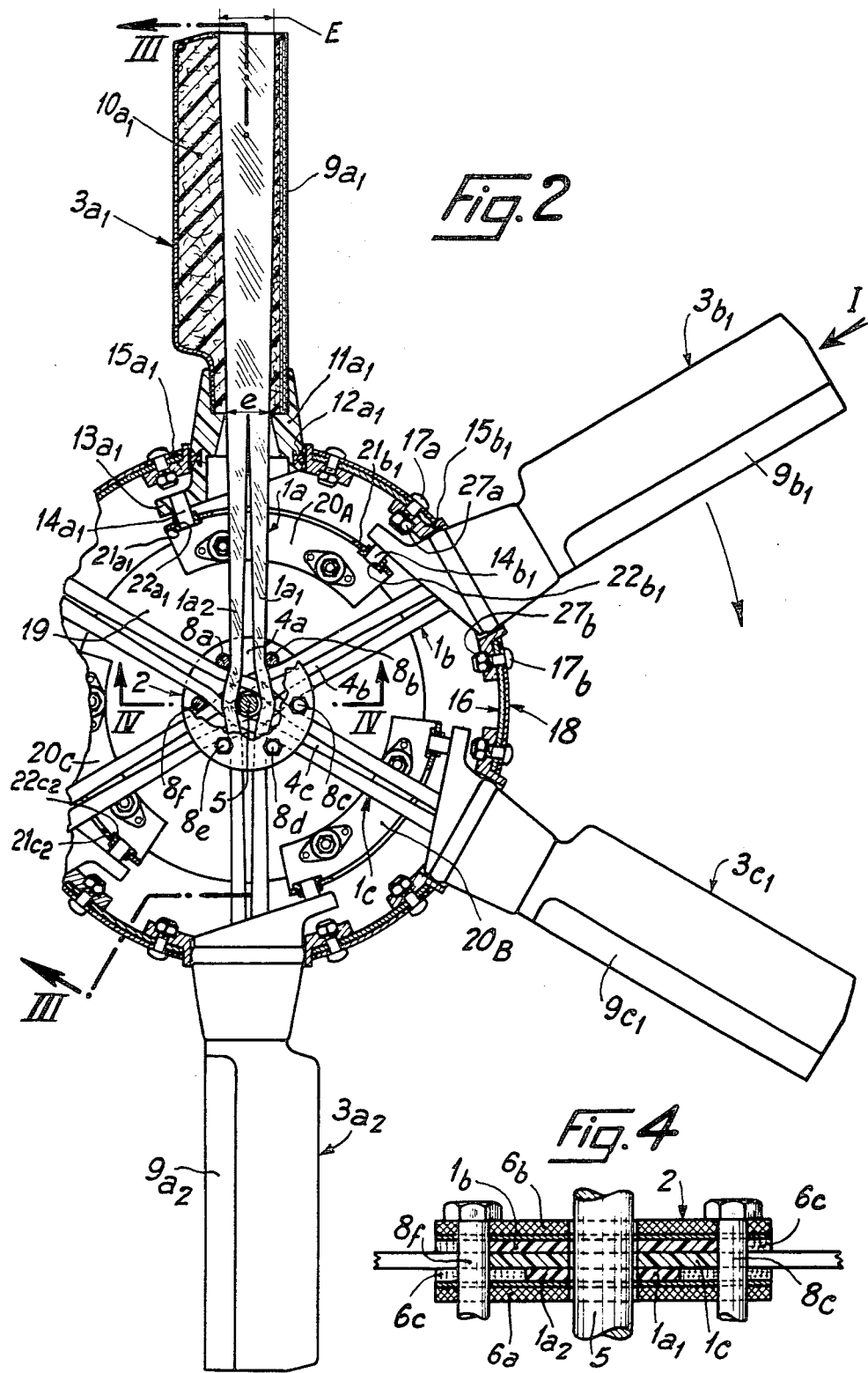

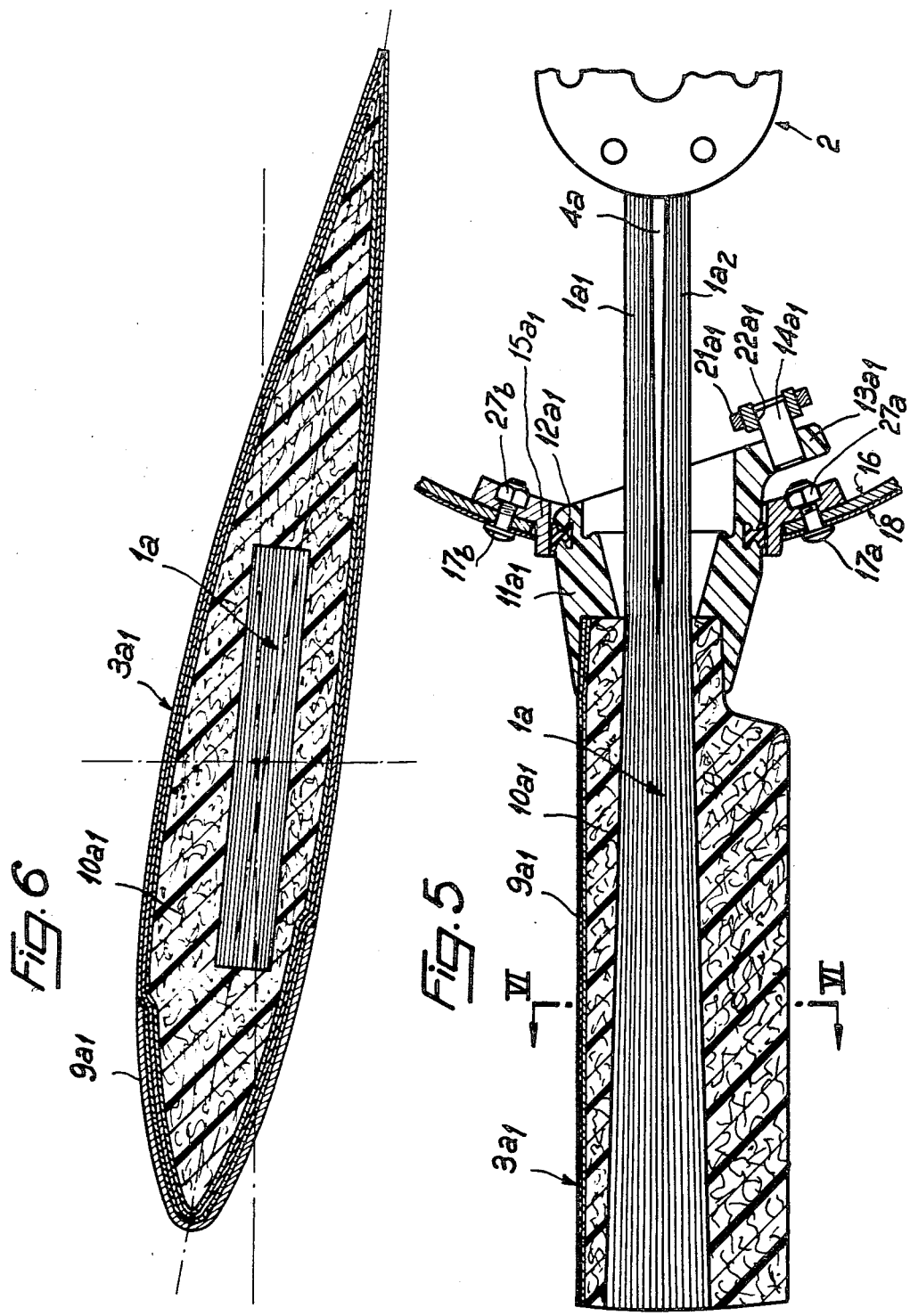

MULTI-BLADE PROPELLERS

DESCRIPTION

The invention relates to a variable-pitch multi-blade propeller of use more particularly as the rear rotor of a rotary-wing aircraft.

U.S. Pat. No. 3,594,097 of Mouille et al entitled "Variable Pitch Propeller or Rotor" filed July 3, 1969 with priority of July 11, 1968 and issued July 20, 1971, described a variable-pitch multi-blade propeller of use more particularly for the aforementioned purpose, wherein each blade is connected to the hub by an elongated radial element capable of twisting around its longitudinal axis, the blade root being fitted into the hub so that the blade can rotate around its longitudinal axis and simultaneously move through an angle during beat and drag; in order to adjust the pitch, each blade root comprises a crank pin connected by a ball joint to an axially moveable plate perpendicular to the propeller axis. The variable-pitch multi-blade propeller can be mounted as a rear rotor in an aperture formed vertically in the rear part of the fuselage or in the vertical tail unit of a rotary-wing aircraft. The aforementioned rear rotor is very advantageous, inter alia in that it is very reliable when the aircraft is flying near the ground; owing to the stream-lining of the aperture in which the rear rotor is mounted, its blades are subjected to lower stresses than those of a conventional non-streamlined rear rotor, thus increasing their service life.

French Patent Specification No. 72.12703 filed on Apr. 7th, 1972 describes a helicopter rotor system comprising at least one pair of opposing blades basically comprising a single elongated strip or longitudinal member secured at its centre to a hub, and two shells having an aerodynamic cross-section and secured to the elongated strip on either side of the hub. The elongated strip forming part of each pair of blades can be made of fibres having high mechanical strength and agglomerated by a synthetic thermosetting resin. The inner end of each shell is also secured to a means for controlling the pitch of the corresponding blade, designed so as to subject the shell to a torque centred on the longitudinal axis of the elongated blade. Rear rotors for a rotary-wing aircraft have also been constructed in fairly similar manner to that described in the aforementioned French Patent Specification No. 72.12703. However, the rear rotors in question are conventional and not streamlined and consequently the various blade shells extend to very near the hub. In addition, the known rear rotors require a complex device for collectively controlling the pitch angles of the various blades, the device comprising levers and control rods having ball joints at each end.

The invention also relates to a variable-pitch multi-blade propeller of the kind comprising at least one pair of opposing blades mainly comprising a single elongated strip of fibres having high mechanical strength agglomerated by a synthetic resin, the strip being secured at its centre to a hub, and two shells having an aerodynamic cross-section secured to the elongated strip of either side of the hub, the internal end of each shell being secured to a means for controlling the pitch angle of the corresponding blade and designed to subject the shell to a torque centred on the longitudinal axis of the strip.

The variable-pitch multi-blade propeller according to the invention is constructed so as to be free from the disadvantages of the multi-blade propellers described in the aforementioned two patent specifications; it is characterised in that each elongated strip is made up of two flat bundles of fibres so as to form an aperture at the centre of the strip through which a sliding shaft can freely extend, the shaft being used for collectively controlling the pitch angles of all the blades, and the shell of each blade is connected along its entire length to the corresponding part of the elongated strip, preferably by a mass of adhesive synthetic cellular or foam material.

Owing to the aforementioned feature of the invention, the variable-pitch multi-blade propeller can be equipped with a very simple device for collectively controlling the pitch angles of all the blades, the device comprising inter alia the sliding shaft which extends through the central aperture of each elongated strip. This feature is particularly advantageous in constructing a rear rotor for a rotary-wing aircraft. Each propeller blade according to the invention also has a simple, rugged, light structure, since the space between the blade shell and the corresponding part of the elongated strip inside shell is completely filled with a mass of low-density synthetic material which if required can have a certain residual resilience. The multi-blade propeller according to the invention is therefore relatively cheap; since it has practically no parts moving relative to one another it does not require to be lubricated and has practically zero maintenance costs. Finally, it is much lighter than the prior art metal-bladed propellers.

In a preferred embodiment of the multi-blade propeller according to the invention, each shell mainly comprises layers of glass fibre fabric and a leading edge made of sheet metal, preferably stainless steel, the assembly being secured together by a polymerized synthetic resin so that the leading edge is incorporated in the layers of fabric. A propeller according to the invention having the last-mentioned preferred embodiment of its blades is substantially insensitive to erosion of the leading edge of the blades, more particularly by grains of sand. Its blades are substantially insensitive to the "notch" effect, so that their service life is practically unlimited.

The invention also relates to a method of manufacturing propeller blades which can be advantageously but not necessarily applied to the manufacture of the previously-defined multi-blade propeller.

By way of example, an embodiment of a variable-pitch multi-blade propeller according to the invention, used as the rear rotor of a rotary-wing aircraft, is described hereinafter and diagrammatically illustrated in the accompanying drawings, in which:

FIG. 1 is a view in elevation;

FIG. 2 is a rear view of the propeller in FIG. 1, in section and partly cut away;

FIG. 3 is a section along line III—III of FIG. 2;

FIG. 4 is a view in section along line IV—IV of FIG. 2;

FIG. 5 is an enlarged view of a detail of FIG. 2;

FIG. 6 is a sectional view along line VI—VI of FIG. 5; and

Figure 7:
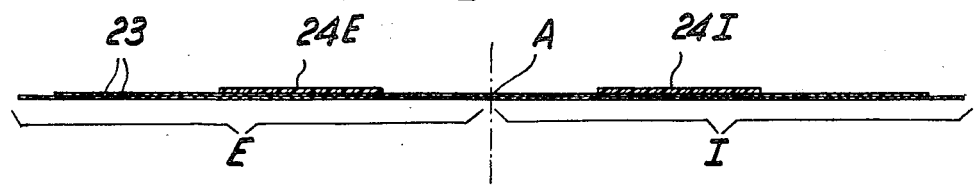
FIGS. 7 to 9 illustrate the method of manufacturing a propeller blade according to FIGS. 1 to 6.

FIGS. 1 to 6 diagrammatically illustrate a propeller according to the invention, which comprises three pairs of blades. According to the invention, each pair of blades mainly comprises a single elongated strip 1a, 1b or 1c secured at its centre to a hub 2, and two shells 3a1 and 3a2 having an aerodynamic cross-section and respectively secured to the corresponding elongated strip, inter alia 1a, on either side of hub 2.

According to the invention, each elongated strip 1a is made up of two flat bundles 1a1 and 1a2 of fibres having high mechanical strength and agglomerated by a synthetic, e.g. thermosetting, resin. Strips of the aforementioned kind, of use more particularly as the cores of rotor blades of rotary-wing aircraft, are manufactured in a wellknown manner which need not be described in detail. It is sufficient to state that strips of the aforementioned kind can be made e.g. of fibres of synthetic material commercially known as Kevlar, or glass fibres or carbon fibres. All these fibres can be agglomerated e.g. by impregnating a bundle thereof with a polymerizable, inter alia, heat-setting resin. The known method can be used inter alia to obtain elongated, thin, relatively narrow strips having particularly advantageous mechanical properties in constructing the cores of rotor blades, since they have high mechanical strength in the longitudinal direction and can thus absorb centrifugal forces applied to both blades without excessive stress or fatigue, and are also relatively flexible, particularly when twisting along their longitudinal axis, so that the pitches of the two blades can be controlled by subjecting the corresponding parts of the elongated strip to relatively weak torques centred on its longitudinal axis.

According to the invention, each strip 1a is constructed so that the two constituent flat bundles of fibres 1a1 and 1a2 form an aperture 4a at the centre of strip 1a for a sliding shaft 5 for collectively controlling the pitch angles of all the blades.

In the preferred embodiment illustrated in the accompanying drawings, the central aperture 4a of each strip 1a is a slot having a width which decreases towards both ends of the strip, the slot extending along not more than half the length of the strip as shown in FIG. 2. According to another feature, those parts of each strip 1a engaging in the two corresponding shells, inter alia 3a1 and 3a2, each have a width which increases slightly in the direction towards the corresponding end of the strip. More particularly, at the top of FIG. 2, the part of strip 1a which engages in shell 3a1 is slightly narrower e at the internal end of the shell than its width E at its outer end.

According to another feature of the multi-blade propeller according to the invention, as shown in section in FIG. 4, its rigid hub 2 comprises a stuck-together stack of superposed central parts of all the elongated strips 1a, 1b and 1c and at least two preferably external layers 6a, 6b made e.g. of glass fibre fabric impregnated with a polymerized synthetic resin, the assembly being embedded in a synthetic filling material 6c. The resulting hub 2 is secured to the tubular drive shaft of the propeller (7 in FIGS. 1 and 3) by pairs of bolts 8a–8f which extend through the periphery of the stack or hub 2 on either side of the corresponding part of each elongated strip. In FIG. 2, for example, the top part of strip 1a is inserted between the two bolts 8b and 8b whereas the right part of strip 1b is inserted between the two bolts 8b and 8c, etc. According to another feature of the invention, the central part of each elongated strip 1a between two pairs of bolts, inter alia 8a–8b and 8e–8d has a width which increases from each pair of bolts, e.g. 8a and 8b, towards the centre of the strip (at shaft 5) where its width reaches a maximum value, greater than the spacing between each pair of bolts, e.g. 8a–8b.

Each shell 3a1 is mainly made up of layers of glass fibre fabric and a leading edge 9a1 of sheet metal, preferably stainless steel. The assembly is agglomerated by a polymerized synthetic resin so that the leading edge 9a1 is incorporated in the layers of fabric forming shell 3a1.

According to another important feature of the invention, each shell 3a1 having the previously described structure is joined along its entire length to the corresponding part of strip 1a by a mass 10a1 of adhesive cellular or foam synthetic material.

A method of manufacturing blades having the aforementioned structure will be described hereinafter.

The aforementioned features of the multi-blade propeller according to the invention have the following advantages. Centrifugal forces applied to each pair of blades are transmitted to hub 2 by strip 1a. The slight conicity of the ends of each strip 1a prevents the other components of each blade, e.g. 3a1, 9a1 and 10a1, from being torn off by centrifugal force. Each central aperture 4a of each strip 1a is shaped and filled with material 6c which prevents the walls of each aperture, inter alia the constituent fibres thereof from being subjected to large shear forces at the maximum pitch angles of the corresponding blades. The same means oppose radial motion of strip 1a since its central and widest part is inserted between two pairs of bolts such as 8a–8b and 8e–8d, the spacing between which is less than the maximum width of the aforementioned central part.

Preferably, each shell 3a1 comprises a number of superposed layers of glass fibre fabric, the layers being preferably disposed so that, for example, their warp threads intersect at 45° so as to increase the mechanical strength of the shell when it has been made rigid by polymerizing the impregnating resin.

According to another feature of the invention, the root of each blade 3a1 is secured to a sleeve 11a1 made e.g. of polyamide filled with glass fibres. When sleeve 11a1 is manufactured by injection-moulding, a metal ring 12a1 (see also FIG. 5) made e.g. of externally anodized aluminium is embedded in the sleeve so that the outer anodized periphery of ring 12a1 projects slightly from the outer surface of sleeve 11a1 and thus forms a journal member having high mechanical strength. As clearly shown in FIGS. 1 and 3, the end of each sleeve 11a1 stuck to the root of the corresponding blade 3a1 has a flattened internal shape adapted to the outer cross-section of the blade root, whereas the opposite end of sleeve 11a1 is cylindrical so that the ring 12a1 can be incorporated. The feature is such that ring 12a1 is coaxial with the longitudinal axis of the corresponding blade, inter alia 3a1, i.e. with the longitudinal axis of the corresponding part of strip 1a. Finally, the internal substantially cylindrical part of each sleeve 11a1 has a lateral arm 13a1 (FIGS. 2 and 5) in which a metal lug 14a1 is partly embedded, the free end of the lug extending towards the collective pitch-control shaft 5 in a plane substantially perpendicular thereto.

Those portions of each blade 3a1 embodied by a metal ring 12a1 are mounted so that they can freely rotate in a corresponding number of bearings 15a1 borne by the periphery of an annular casing 16 which is cup-shaped in the present embodiment. As shown inter alia in FIG. 3, casing 16 is secured to hub 2 by the aforementioned bolts 8a–8f. To this end, the flat bottom 16a of casing 16 is inserted between the base of hub 2 and an annular collar 7a secured to the end of the tubular drive shaft 7, the assembly 2, 16a, 7a being secured together by bolts 8a–8f. In the embodiment under consideration, each bearing such as 15a1 is made of self-lubricating material, e.g. by injection-moulding. Each bearing 15a1 rests in a semi-circular recess in the side wall of casing 16. In the embodiment in question, each bearing 15a1 has lateral projections for securing it to the side wall of casing by means of two screws 17a, 17b on FIG. 1, for securing the bearing 15b1 corresponding to blade 3b1. Casing 16 is covered by a cap 18 which is slightly convex in the embodiment illustrated in FIGS. 1 and 3. Cap 18 has semi-circular recesses for the bearings, e.g. 15a1, of the various blades, inter alia 3a1. In addition to the semi-circular recesses, the free edge of the side wall of cap 18 is formed with open slots 19a for at least some of the screws 17b securing the bearings 15b1, whereas simple apertures are formed in the side wall of cap 18 for the other securing screws such as 17a.

The sliding shaft 5 for collectively controlling the pitch of each respective blade extends through the central aperture of hub 2, corresponding inter alia to the matching parts of the central apertures 4a for the various strips 1a, and then extends for a suitable length in the direction of cap 18; its end 6a (FIG. 3) is secured to a device for coupling shaft 5 to lugs 14a1 for controlling the sleeves (e.g. 11a1) of the various blades. In the illustrated embodiment, the coupling device comprises a plate 19 substantially perpendicular to shaft 5 and secured to three components 20A–20C (FIG. 2) each having a pair of arms formed with apertures for engaging the lugs controlling the sleeves of two adjacent blades. More particularly FIG. 2 clearly shows the component 20A, which is in the form of a sector of a ring and secured, inter alia by bolts, to the internal surface of plate 19 and is formed at both ends with arms 21a1 and 21b1 formed with respective ringed apertures 22a1, 22b1 for receiving the control lugs 14a1, 14b1 of the two adjacent blades 3a1, 3b1 (see also FIG. 5). When shaft 5 for collectively controlling the pitch angles of all the blades is in neutral position (FIG. 3), the ringed apertures 22a1, 22b1 are centred substantially in the same plane, perpendicular to shaft 5, which substantially contains the central axes of all the strips such as 1a, so that each strip is plane along its entire length and the blades all have zero pitch. When, on the other hand, shaft 5 moves in the direction of arrow f (FIG. 3) its end 5a moves plate 9 in the same direction, thus driving all the components such as 20A in the direction of dome 18, so that the corresponding ringed apertures 22a1 move the control lugs such as 14a1 of the blade sleeves such as 11a1 outside the aforementioned neutral plane. The result is that a torque is retransmitted to the strip (e.g. 1a) of each blade (e.g. 3a1) by the corresponding sleeve 11a1, the torque being centred on the longitudinal axis of strip 1a. The resulting indentical torques on the ends of all the strips (e.g. 1a) pivot the corresponding shells of all the blades in the same direction so that they all have the same pitch angle as shown in FIG. 1.

We shall now describe a method of manufacturing the variable-pitch multi-blade propeller illustrated in FIGS. 1 to 6.

As already stated, the process of manufacturing each elongated strip (of fibres having high mechanical strength, agglomerated by a synthetic thermosetting resin) is already known and therefore need not be described in detail.

Figure 8:
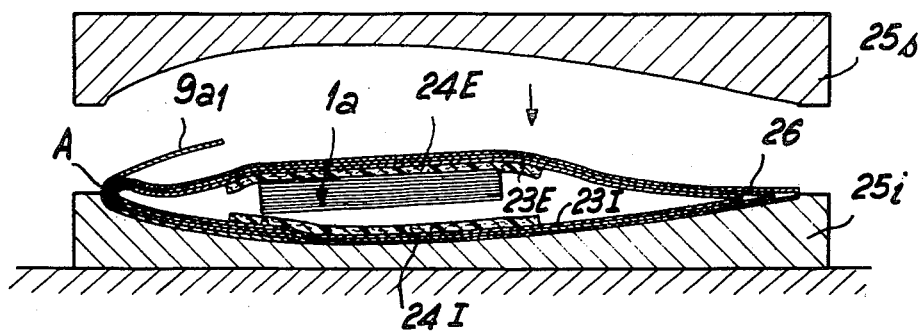
Figure 9:
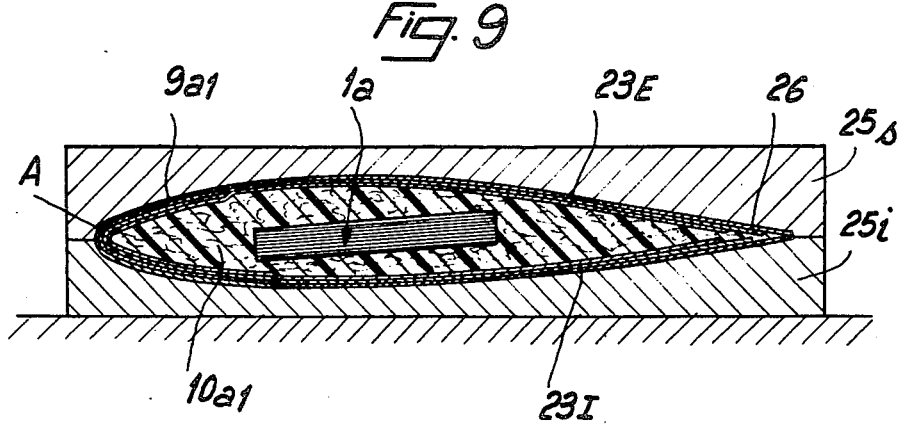

We shall, however, give a detailed description of the manufacture of the shell (e.g. 3a1) of one of the blades and of moulding it on to the corresponding end of strip 1a, with reference to FIGS. 7 to 9.

As illustrated in FIG. 7, elongated layers of fabric, inter alia glass fibre fabric, are first cut. The elongated fabric layers 23 have two parts, one on each side of a central axis A. One part I is adapted to form the undersurface of the blade and the other part E is adapted to form its upper surface. Layers 23 are impregnated with a polymerizable resin and a first and a second thin longitudinal band (24E and 24I) of adhesive material which swells on heating are deposited at suitable places on the two parts I and E. As shown in FIG. 8, the undersurface part 23I is placed at the bottom of a bottom half-mould 25i. In FIG. 8 the bottom half-mould 25i, like the top or complementary half-mould 25s, is shown in cross-section through a plane substantially perpendicular to the longitudinal axis of the blade which is to be manufactured. Of course, the cavities in the two half-moulds 25i and 25s have shapes adapted to the final desired aerodynamic cross-section of the corresponding shell 3a1. The shape of the mould is adapted not only in cross-section, as shown in FIGS. 8 and 9, but also in the longitudinal direction perpendicular to the plane of the two Figures.

The undersurface part 23I is placed at the bottom of the bottom half-mould so that the first band 24I of adhesive material faces upwards. Next, the corresponding end of strip 1a is secured above band 24I as shown in FIG. 9, of course outside the fabric layers 23, e.g. at the central part of strip 1a, so that elements 23I and 1a are placed in their final relative position. Next, the upper-surface part 23E is folded above strip 1a so that the strip is covered by the second band of adhesive material 24E and the two longitudinal edges of fabric layers 23 are brought together in the region 26 for forming the trailing edge of the blade. Next, the sheet-metal leading edge 9a 1 is placed in the corresponding part of half-mould 25i outside the central part A of the folded fabric layers 23I and 23E.

Next, the top half-mould 25s is secured by any appropriate means to the bottom half-mould 25i and the complete mould is given appropriate heat-treatment, e.g. in an oven or furnace, so as to polymerize the resin impregnating layers 23I and 23E and also swell the two strips of adhesive material 24I and 24E. When the adhesive material swells it presses the upper-surface part 23A right into the top half-mould 25s (and against the top component of the metal leading edge 9a1). thus completely filling the space which, as shown in FIG. 8, was previously left between strip 1a and at least some parts of layers 23. The fabric layers have been made rigid by the polymerization of the resin impregnating them, so as to form shell 3a1 incorporating the sheet-metal leading edge 9a1. It can be seen, therefore, that when the adhesive material forming strips 24I and 24E swells, the result is a mass of filling material 10a1 which secures shell 3a1 to the corresponding part of strip 1a.

In the case of the six-bladed propeller in FIGS. 1 to 6, the six shells 3a1 are preferably moulded on to the ends of three strips 1a, superposed by their central parts, at the same time as the polymerization of the substances impregnating the superposed layers of hub 2 in FIG. 4. To this end use is made of a single two-part mould having six lateral cavities for moulding the six blade shells and one central cavity for forming the hub and communicating with the side cavities via radial channels for conveying the intermediate parts of strips 1a–1c.

The blade root sleeves (e.g. 11a1) are threaded on to the corresponding parts of the shells before the moulding operation, and after the operation they are stuck to the corresponding parts of the shells. The assembly formed by the three strips fitted into hub 2 and the six previously-moulded shells is then placed at the bottom of the cup-shaped casing 16 in the position illustrated in FIGS. 2 and 3 so that the cylindrical parts of the sleeves (e.g. 11a1) rest in the corresponding semi-circular recesses in the side wall of casing 16. Next, the various bearings (e.g. 15a1) can be threaded on to the corresponding blades and inserted between (a) the edges of the aforementioned semi-circular recesses and (b) the rings (e.g. 12a1) of the corresponding blade roots, by making advantageous use of the flexibility of each strip 1a in its part between a blade root and the hub. Next, one of the two side projections of each bearing (e.g. 15b1, FIG. 1) can be secured by a screw (e.g. 17b) which is tightened in a nut (e.g. 27b) embedded in the corresponding lateral projection of bearing 15b1. Next, the tubular drive shaft 7 can be secured to the bottom 16a of the casing and to hub 2, using six bolts 8a–8f. After control shaft 5 has been inserted through tubular shaft 7 and the central aperture of hub 2, plate 19 is secured to its end 5a, e.g. by a nut 19a. Next, components 20A–20C are all screwed to the periphery of that surface of plate 19 which faces hub 2, the control lugs (e.g. 14a1) of sleeves 11a1 being engaged in the corresponding ringed apertures 22a1. Next, the dome-shaped cap 18 is mounted so that its side wall covers the wall of casing 16. The shanks of screws 17b temporarily secure the bearings 15b1 after being untightened so that their shanks engage in the slots 19a in the free edge of the side wall of cap 18. The process is completed by tightening screws 17b and finally securing bearings 15b1 by screws 17a fitting into nuts 27a which in turn are embedded in the second lateral projections of the aforementioned bearings.

The invention is not limited to the previously-described embodiment but all includes variants thereof.

More particularly, the device for coupling the collective pitch-control sliding shaft to the control lugs of all the blade sleeves is optional. Cap 18 is optional. The bearings of the various blades could be moulded together with casing 16, more particularly if the bearings comprise conventional lubricating means. In the case of independent bearings, the means for securing them to the side wall of casing 16 are optional. Casing 16 may be integral with the tubular drive shaft 7. Instead of being embedded in the blade root sleeves 11a1, the metal rings forming portions of the blade roots can be stuck to the outer surfaces of the cylindrical parts of the sleeves. The shape and dimensions of each blade 1a and the shape and dimensions of its central aperture 4a. The material 10a1 filling each blade 31a can be either cellular or foam and can be formed e.g. by swelling a known adhesive synthetic material. The swelling may be produced not only by heat treatment as previously described but also by chemical treatment in known manner. The propeller according to the invention can have any even number of blades (at least two).

The method of manufacturing a multi-blade propeller according to the invention as previously described can be applied to the manufacture of any propeller blade comprising a hollow shell containing a core having a volume less than that of the cavity in the shell. If an appropriate quantity of a swelling adhesive material (e.g. which swells of heating) is placed in the shell cavity and if the adhesive material is swollen by the appropriate heat treatment for the hollow shell and its contents, the adhesive material swells and completely fills the space between the core and the shell so as to secure one to the other.

The method according to the invention, which has been defined in the most general manner, can also be used in the case where the blade shell is made of appropriate fabric, coated if required with a polymerizable resin but initially flexible. In the latter case, the flexible shell enclosing the rigid core and the swelling adhesive material is placed in a mould having an internal cavity suited to that of the blade, after which the mould and its contents are heat-treated so that the adhesive material swells and presses the flexible shell against the mould; the shell may also be hardened by polymerization of the impregnating resin.

The method of manufacturing blades according to the invention is particularly advantageous in that it obviates the need to cut a solid blade having a very precisely defined cross-section out of a solid metal or synthetic blank, as has been necessary hitherto. In the method according to the invention, the aforementioned machining operation, which was long and very expensive, is replaced by a series of very simple coating and moulding operations which do not require the use of machine tools or highly specialized labour.

What we claim:

1. A variable pitch multi-blade propeller of use more particularly as the rear rotor of a rotary-wing aircraft comprising
   an axis of the rotor,
   at least one pair of blades mounted diametrically opposed with respect to said rotor axis,
   a tubular rotor driving shaft bearing a rigid rotor hub rotatably mounted around said rotor axis,
   said at least one pair of blades including
   a single composite spar common to the two said blades secured at its central part to said rotor hub and made of fibers having high mechanical strength and agglomerated by a synthetic resin,
   and two radial shells having an aerodynamic cross-section and secured to said composite spar, one on each side of said rotor hub,
   a pitch control shaft slidingly mounted through said tubular driving shaft, said hub and the central part of each said spar for collectively controlling the pitch angles of all said blades,
   a coupling element substantially perpendicular to and integral with said pitch control shaft,
   a pitch control assembly with the inward end of each said shell secured to said assembly and subjecting said shell to a torque centered on the longitudinal axis of the corresponding said spar,
   each said composite spar being made up of a single elongated strip, the fibers of which are all unidirectional and longitudinal fibers,
   said strip being made up in its central portion, between said two corresponding shells, of two flat bundles each presenting fibers all extending without any interruption from one end of said corresponding bundle to the other end, and having a slot defined in the middle of said strip by the central parts of said two bundles being separated one from the other,
   said pitch control shaft directly and freely slidingly mounted thrugh said slot,
   said shell of each said blade being internally connected along its entire length to the corresponding part of said elongated strip by a mass of adhesive synthetic cellular or foam material.

2. A propeller according to claim 1, wherein said slot in each said elongated strip has a width which decreases towards the two ends of said strip and extends along not more than half the length of said strip.

3. A propeller according to claim 1, wherein parts of each elongated strip which engage in the two respective shells each have a width which slightly increases in the direction towards the respective outer end of the strip.

4. A propeller according to claim 1, wherein said rigid hub is formed by a stuck-together stack, comprising the superposed central parts of all elongated strips and at least two layers of fabric impregnated with a polymerized resin.

5. A propeller according to claim 4, wherein said hub is secured to said tubular driving shaft 7 by pairs of bolts 8 which extend through the periphery of the hub 2 forming stack, on either side of the corresponding central part of each said elongated strip.

6. A propeller according to claim 5, wherein the central part of each elongated strip, extending between two pairs of securing bolts, has a width which increases from each pair of bolts towards the centre of the strip, where its width reaches a maximum value, greater than the spacing between each pair of bolts.

7. A propeller according to claim 1, wherein each shell mainly comprises layers of glass fibre fabric and a leading edge made of sheet metal, the assembly being secured together by a polymerized synthetic resin so that the leading edge is incorporated in the layers of fabric.

8. A propeller according to claim 1, wherein said pitch control assembly of each said blade comprises a sleeve of glass-fiber reinforced synthetic material, a journal member including a metal ring mounted on the external wall of the inner end of said sleeve coaxial with the longitudinal axis of said corresponding blade, and a metal control lug embedded in a lateral arm at said inner end of the sleeve.

9. A propeller according to claim 8, wherein the journal members of all the blades are mounted so as to freely rotate in a same number of bearings which are mounted on the periphery of an annular casing, secured to said rigid rotor hub and said tubular driving shaft.

10. A propeller according to claim 9, wherein each bearing is made of moulded self-lubricating material and is mounted in a semi-circular recess in the side wall of said annular casing, which is cup-shaped, said bearing being secured to said side wall by at least two screws each extending through a lateral projection of the bearing.

11. A propeller according to claim 10, wherein the cup-shaped casing is surmounted by a cap formed with semi-circular recesses for the bearings of the various blades and slots for at least some of the screws securing the bearings to the casing side wall.

12. A propeller according to claim 8 wherein said coupling element comprises a plate fixed at the end of the pitch control shaft and to which are secured pairs of arms each formed with apertures for engaging said control lugs of said sleeves of two adjacent blades.

* * * * *